(12) United States Patent
Field

(10) Patent No.: US 9,734,708 B2
(45) Date of Patent: Aug. 15, 2017

(54) SAFE INTERACTION OF A USER WITH A SMART UTILITY METER

(71) Applicant: ITRON METERING SOLUTIONS UK LTD., Ipswich (GB)

(72) Inventor: Anthony Field, Ipswich (GB)

(73) Assignee: ITRON METERING SOLUTIONS UK LTD., Ipswich (GB)

( * ) Notice: Subject to any disclaimer, the term of this patent is extended or adjusted under 35 U.S.C. 154(b) by 152 days.

(21) Appl. No.: 14/345,581

(22) PCT Filed: Sep. 26, 2012

(86) PCT No.: PCT/GB2012/052387
§ 371 (c)(1),
(2) Date: Mar. 18, 2014

(87) PCT Pub. No.: WO2013/045923
PCT Pub. Date: Apr. 4, 2013

(65) Prior Publication Data
US 2015/0002309 A1    Jan. 1, 2015

(30) Foreign Application Priority Data

Sep. 27, 2011    (EP) .................... 11182871

(51) Int. Cl.
*G08C 23/04*    (2006.01)
*G01D 4/00*    (2006.01)

(52) U.S. Cl.
CPC ............. *G08C 23/04* (2013.01); *G01D 4/002* (2013.01)

(58) Field of Classification Search
CPC ........ G01D 4/002; G01D 4/006; G08C 23/04; H04Q 2209/60; Y02B 90/243; Y04S 20/325

(Continued)

(56) References Cited

U.S. PATENT DOCUMENTS 5,528,233 A * 6/1996 Hansell .................. G08C 23/04
340/870.02
5,644,222 A * 7/1997 Dohmstreich ......... G01R 35/04
324/74

(Continued)

FOREIGN PATENT DOCUMENTS

CN    2784887 Y * 5/2006 ............. G01F 15/16
EP    0777203    6/1997

(Continued)

OTHER PUBLICATIONS

International Searching Authority, International Search Report and the Written Opinion issued in connection with International Application No. PCT/GB2012/052387: dated Oct. 29, 2012, 9 pages.

(Continued)

*Primary Examiner* — Quan-Zhen Wang
*Assistant Examiner* — Stephen Burgdorf
(74) *Attorney, Agent, or Firm* — Hanley, Flight & Zimmerman, LLC

(57) ABSTRACT

The invention relates to a method for enabling a user to safely interact with a smart utility meter (1), comprising the following steps:—Transmission by said user of a command signal from a remote handheld electronic device (2) through a short range wireless optical communication link (3) between optical transmitting means (20) provided on said handheld electronic device (2) and optical receiving means (11) provided on said smart utility meter (1); —Reception of said command signal on said optical receiving means (11).

12 Claims, 1 Drawing Sheet

Figure 1:
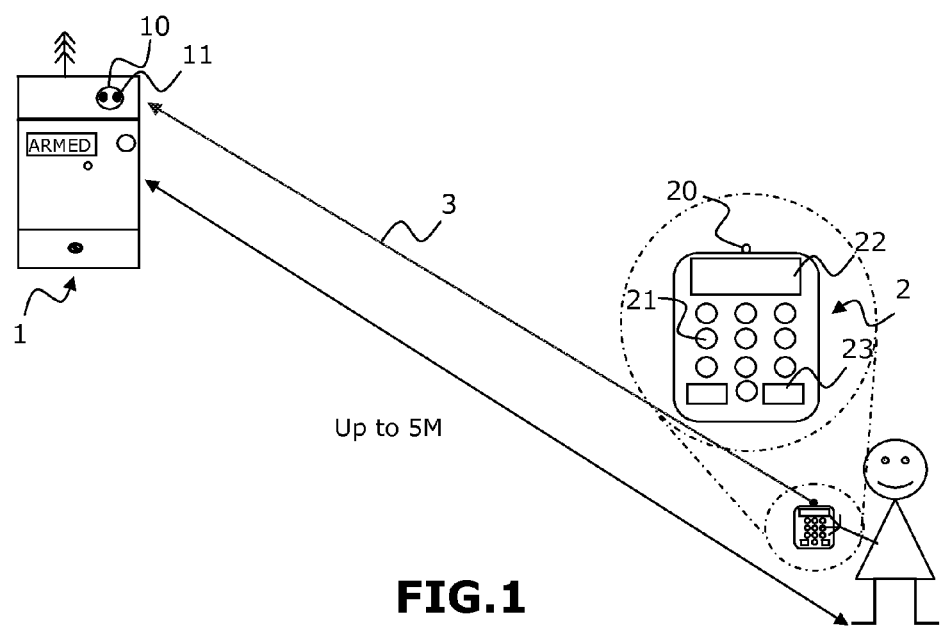

(58) Field of Classification Search
USPC .................................. 340/870.02, 870.28
See application file for complete search history.

(56) References Cited

U.S. PATENT DOCUMENTS

| | | | |
|---|---|---|---|
| 5,811,675 A | 9/1998 | Hamer | |
| 5,963,650 A * | 10/1999 | Simionescu | G01D 4/004 340/870.02 |
| 6,507,762 B1 | 1/2003 | Amro et al. | |
| 6,529,883 B1 * | 3/2003 | Yee | G06Q 20/127 705/400 |
| 7,228,726 B2 * | 6/2007 | Kates | G01M 3/2815 340/632 |
| 2005/0104744 A1 * | 5/2005 | Patterson | G01D 4/006 340/870.02 |
| 2006/0076944 A1 * | 4/2006 | Weikel | G01R 22/063 324/74 |
| 2006/0114121 A1 * | 6/2006 | Cumeralto | H04Q 9/00 340/870.02 |
| 2006/0255965 A1 * | 11/2006 | Nagy | G01D 4/002 340/870.02 |
| 2007/0103335 A1 * | 5/2007 | Fitzgerald | G01D 4/002 340/870.02 |
| 2010/0073191 A1 * | 3/2010 | Beverung | G01D 4/006 340/870.02 |
| 2011/0284777 A1 * | 11/2011 | Pitchford | F16K 31/086 251/65 |
| 2012/0101910 A1 * | 4/2012 | Neri-Badillo | G01D 4/00 705/18 |

FOREIGN PATENT DOCUMENTS

| | | | | |
|---|---|---|---|---|
| EP | 1107209 | | 6/2001 | |
| EP | 2096415 | | 9/2009 | |
| GB | WO 0139145 A1 | * | 5/2001 | ........... G06Q 20/127 |
| GB | 2408578 A | * | 6/2005 | ........... G06Q 20/04 |

OTHER PUBLICATIONS

European Patent Office, European Search Report issued in connection with European Patent Application 11182871.1, dated Dec. 30, 2011, 4 pages.

* cited by examiner

SAFE INTERACTION OF A USER WITH A SMART UTILITY METER

The invention relates to a method for enabling a user to safely interact with a smart utility meter.

There might be several cases where a user needs to interact with the smart utility meters (electricity, gas or water meters) installed in his home.

For instance, some types of smart meters known as prepayment meters need to be supplied with an appropriate token ahead of the delivery of the service in order that a particular quantity or value of service may be delivered to the consumer. The token is inputted into the prepayment meter which thus obtains a credit for an appropriate quantity of energy.

Today, very little interaction is required with the meter because prepayment operation is carried out using a token based system, whereby a consumer only has to put the token in the meter. Tokens can be a card or key loaded with credit. The credit is subsequently transferred to the meter by insertion of the card or key in to a reader slot in the meter which is adapted for this purpose. Alternatively, tokens correspond to a code which can be input via a suitable keyboard on the meter. In case no new credit has been loaded, the prepayment meter terminates the supply of the service once the quantity or value of service has been delivered, typically by closing a supply valve in the case of gas or water meters, or by opening an electricity contactor in the case of electricity meters. Once the credit has been used, further credit may still be purchased and added to the meter as explained above. In this case however, there is a safety requirement for the consumer to not be able to close the electricity contactor or open the gas or water valve on a meter without interacting with the meter. Hence, loading new credit in the meter simply puts the meter into an armed status and does not necessarily automatically restore supply. After the loading of the new credit, the consumer must interact with the meter, typically by pressing a dedicated button provided on the meter, in order to restore the energy supply.

In the future however, the consumer will not have to use a token but more over an electronic credit message will be transmitted to the meter via some automated communication system or Wide Area Network (WAN). One advantage will be that the meter will be able to be installed at any place, including hardly accessible places, and will not need to be provided with smart card reader anymore. The drawback of this will be that in some situations the WAN will be temporarily not functioning and require the consumer to enter vending code (around 20 digits long) into the meter with limited button functionality on the meter, and possibly difficulty to access the meter buttons and displays.

More generally, for any type of smart utility meter including credit meters which are used by customers who pay their utility service bill once they have used the resource, the consumer may have to interact with the meter, for instance to restore the energy supply in case the supply valve (gas or water) has been closed or the electrical contactor has been opened whatever the reasons.

Some have suggested that there should be a wired interface that allows customers to enter vending codes and/or activate valves and contactors via a wired display. This approach although guarantees where the customer is standing when he interacts with the meter (governed by the length of the wire) is very costly due to the added interface needed on the meter, additional kit, and sending out an engineer to fit this kit.

Consequently, there is a need to provide a low cost mechanism which would allow a user to safely interact with a smart meter whatever its location at home.

To this end, the invention proposes a method for enabling a user to safely interact with a smart utility meter, comprising the following steps:

Transmission by said user of a command signal from a remote handheld electronic device through a short range wireless optical communication link between optical transmitting means provided on said handheld electronic device and optical receiving means provided on said smart utility meter.

Reception of said command signal on said optical receiving means.

According to some additional advantageous features of the invention:

Transmission of said command signal is preferably triggered by a user's action on a press button provided on said handheld electronic device;

Said method may further comprise an initiation step in which said optical receiving means are settled into a listening mode;

The command signal is transmitted according to the IEC 62056 series of standards;

In case said smart utility meter is a prepayment meter, said signal command comprises a piece of encoded information corresponding to a credit amount for authorizing delivery of energy;

Said signal command may be a specific command comprising a piece of encoded information for instructing said smart utility meter to restore the energy supply. This complies with the safety requirement according to which a user must interact with a meter which is in an armed status for closing the contactor or opening the valve.

The invention also relates to a smart utility meter for implementing the method, characterized in that it comprises optical receiving means adapted to receive a command signal transmitted from a remote handheld electronic device through a short range wireless optical communication link in order to restore the energy supply or to add new credit amount for authorizing delivery of energy in case said smart utility meter is a prepayment meter.

The invention also relates to a handheld electronic device for implementing the method, characterized in that it comprises optical transmitting means adapted to remotely transmit a command signal to a smart utility meter through a short range wireless optical communication link in order to restore the energy supply or to add a new credit amount for authorizing delivery of energy in case said smart utility meter is a prepayment meter.

Figure 2:
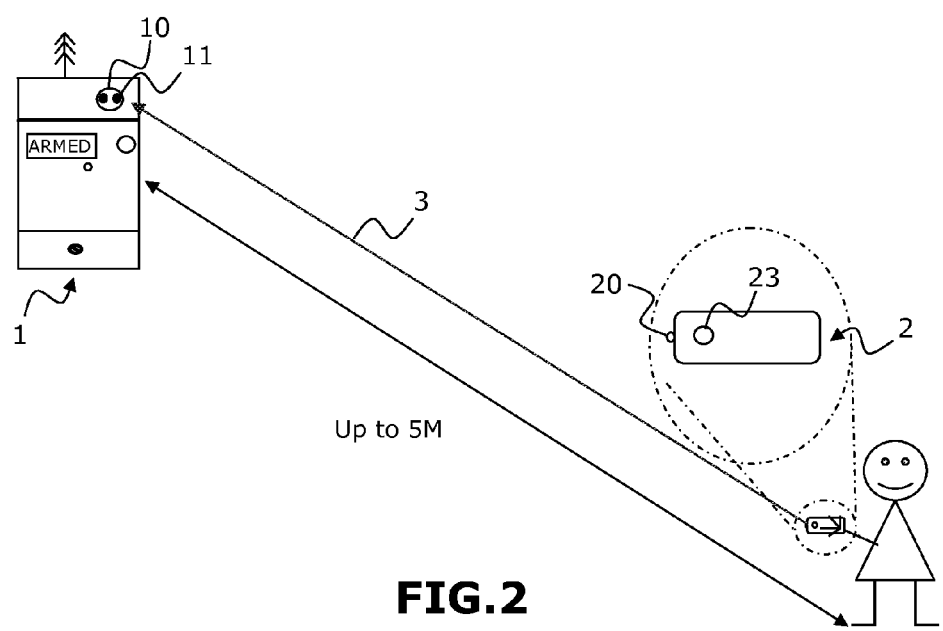

These and other features of the invention will now be more fully disclosed in the following description with reference to the accompanying drawings, in which:

FIG. 1 schematically illustrates a system according to a first embodiment implementing the method of the invention for the purpose of adding new credit to a prepayment smart utility meter;

FIG. 2 schematically illustrates a system according to a second embodiment implementing the method of the invention for the purpose of restoring the energy supply with rearming of a smart utility meter.

With reference to FIG. 1, a prepayment smart utility meter 1 is shown located in an awkward position, e.g. located too high for the consumer to interact with in a precise way on a regular basis. Smart utility meter 1 may have WAN capacities for bidirectional exchanges with a back haul network (not shown), for instance through GPRS communications. FIG. 1 illustrates the particular case where a consumer needs to add new credit to the meter before having completely run out of credit, at a time when the over the air mechanism through WAN is for some reason not available.

The basis of the method according to the present invention is to use an industry standard optical port 10 provided on some electricity meters or other electronic devices today. Currently this optical port 10, which follows the IEC 62056 series of standards, is used in transmit and receive mode with sign on facility for the purpose of local configuration by the manufacturer of the meter.

According to the embodiment of FIG. 1, the consumer can interact remotely with prepayment meter 1 in order to add new credit through the use of a dedicated remote handheld electronic device 2, e.g. a simple battery operated device similar to a TV remote control, provided with optical transmitting means 20 adapted for transmission of a command signal through a short range wireless optical communication link 3. Optical transmitting means 20 are typically an infra red electroluminescent diode with maximum coverage range of substantially five meters.

In the exemplary embodiment, handheld electronic device 2 is also provided with entering means 21, here a keypad, which enables the consumer to enter a value or code (e.g. a 20 digit code) corresponding to a new credit amount he wants to add to the prepayment meter. Alternatively, said entering means could be a card reader in which a card storing said code, although this solution is more costly. Handheld electronic device 2 can also have on it a small display 22 to show the code that has been entered before sending it to the meter. The value is then converted into a piece of encoded information before being transmitted in the command signal. The transmission is preferably triggered by a user's action on a press button 23 provided on handheld electronic device.

The command signal is then received on optical receiving means 11 of smart utility meter 1, which can then retrieve the value and load the corresponding new credit amount in a memory (not shown) of the meter.

In case prepayment meter 1 has already run out of credit before the new credit has been loaded, the above action only puts the meter into a rearmed status. The consumer thus needs to instruct the meter to restore the energy supply, either by re opening the supply valve (gas or water meter), or by re closing the electrical contactor (electricity meter). To this end, the signal command comprises a piece of encoded information for instructing said smart utility meter 1 to restore the energy supply.

New credit value and instruction for restoring the energy supply could be sent within the same unique command signal. Alternatively, a dedicated signal command is created for sending the instruction of restoring the energy supply. In both cases, the transmission through the short range wireless optical link 3 triggered by the press button guarantees that the user is in the same room as the meter when pressing the button, hence reducing the risk of consumers turning on supply when it is not safe to do so.

For energy consumption saving purpose, the method according to the invention may further comprise an initiation step at the meter's side in which optical receiving means 11 are settled into a listening mode. This can be a particular instruction code within the software ran by the meter which settle optical receiving means 11 into a listening mode only when the meter has to be re armed, or when the remaining credit value is less than a predetermined threshold value.

FIG. 2 schematically illustrates a system according to a second embodiment which can be used for any type of smart utility meter (prepayment or credit meter) for the purpose of restoring the energy supply with rearming of a smart utility meter.

In this case, handheld device 2 may be a very simple battery operated device, provided with at least optical transmitting means 20 and press button 23. Upon pressing on said button 23, a specific signal command comprising a piece of encoded information for instructing smart utility meter 1 to restore the energy supply is transmitted by transmitting optical means 20 through short range optical link 3.

Upon reception of this specific command on its optical receiving means 11, meter 1 can then retrieve the piece of encoded information, and restore the energy supply, either by re opening the supply valve (gas or water meter), or by re closing the electrical contactor (electricity meter).

The solution according to the invention does not involve expensive wiring, nor a special port for connection to the meter since optical port 10 is already supplied as standard on any meter.

The invention claimed is:

1. A method for enabling a safe interaction with a prepayment smart utility meter, comprising:
    transmitting a command signal from a remote handheld electronic device through a short range wireless optical communication link between an optical transmitter provided on the handheld electronic device and an optical receiver provided on the prepayment smart utility meter, wherein the command signal comprises encoded information corresponding to a credit amount for authorizing delivery of energy and encoded information to instruct the prepayment smart utility meter to restore an energy supply wherein the command signal is transmitted according to the IEC 62056 series of standards; the method further comprising the prepayment smart utility meter taking an initiation step which comprises:
    settling the optical receiver of the prepayment smart utility meter into a listening mode for receiving the command signal based on an instruction code within software run by the prepayment smart utility meter, wherein the software settles the optical receiver into a listening mode based on a meter re-armed status.

2. A method according to claim 1, wherein transmitting the command signal is triggered by actuation of a press button provided on the remote handheld electronic device.

3. A method according to claim 1, wherein settling the optical receiver of the prepayment smart utility meter into the listening mode includes settling the optical receiver of the prepayment smart utility meter into the listening mode only when the prepayment smart utility meter has to be re-armed for energy supply, or when a remaining prepayment credit value associated with the prepayment smart utility meter is less than a predetermined threshold value.

4. A method according to claim 1, wherein the software settles the optical receiver into a listening mode based on a prepayment account condition associated with the prepayment smart utility meter.

5. A method according to claim 1, wherein the optical transmitter provided on the handheld device has short range coverage.

6. A method according to claim 5, wherein the optical transmitter provided on the handheld device has a maximum coverage of approximately five meters.

7. A prepayment smart utility meter comprising:
an optical receiver adapted to receive a command signal transmitted from a remote handheld electronic device through a short range wireless optical communication link to one of restore an energy supply and add a new credit amount for authorizing delivery of energy, wherein the command signal comprises encoded information corresponding to a credit amount for authorizing delivery of energy and encoded information to instruct the prepayment smart utility meter to restore an energy supply, wherein the optical receiver is part of an IEC 62056 standardized optical port; and
software operable to settle the optical receiver into a listening mode as a result of the prepayment smart utility meter taking an initiation step, wherein the software settles the optical receiver into a listening mode based on a meter re-armed status.

8. A handheld electronic device comprising:
an optical transmitter adapted to remotely transmit a command signal to a prepayment smart utility meter through a short range wireless optical communication link to one of restore an energy supply and add a new credit amount for authorizing delivery of energy, wherein the command signal comprises encoded information corresponding to a credit amount for authorizing delivery of energy and encoded information to instruct the prepayment smart utility meter to restore an energy supply;
wherein the prepayment smart utility meter comprises software operable to settle an optical receiver on the prepayment smart utility meter into a listening mode as a result of the prepayment smart utility meter taking an initiation step, wherein the optical receiver is part of an IEC 62056 standardized optical port, and wherein the software settles the optical receiver into a listening mode based on a meter re-armed status.

9. A handheld electronic device according to claim 8, wherein the optical transmitter comprises an infrared electroluminescent diode.

10. A handheld electronic device according to claim 8, further comprising a press button to trigger the transmission of the command signal.

11. A handheld electronic device according to claim 8, further comprising an interface for entering a value corresponding to the new credit amount.

12. A method for enabling a safe interaction with a prepayment smart utility meter, comprising:
transmitting a command signal from a remote handheld electronic device through a short range wireless optical communication link between an optical transmitter provided on the handheld electronic device and an optical receiver provided on the prepayment smart utility meter, wherein the command signal comprises encoded information corresponding to a credit amount for authorizing delivery of energy and encoded information to instruct the prepayment smart utility meter to restore an energy supply, wherein the command signal is transmitted according to the IEC 62056 series of standards; the method further comprising the prepayment smart utility meter taking an initiation step which comprises:
settling the optical receiver of the prepayment smart utility meter into a listening mode for receiving the command signal based on an instruction code within software run by the prepayment smart utility meter, wherein the software settles the optical receiver into a listening mode based on a prepayment account condition associated with the prepayment smart utility meter.

* * * * *